(No Model.)

L. KYSER & A. C. REX.
TOY MONEY BOX.

No. 281,377. Patented July 17, 1883.

Attest
Chas. F. Opitz
William McC. Wade

Inventor
Louis Kyser & Alfred C. Rex
By his atty

UNITED STATES PATENT OFFICE.

LOUIS KYSER AND ALFRED C. REX, OF PHILADELPHIA, PENNSYLVANIA.

TOY MONEY-BOX.

SPECIFICATION forming part of Letters Patent No. 281,377, dated July 17, 1883.

Application filed May 21, 1883. (No model.)

*To all whom it may concern:*

Be it known that we, LOUIS KYSER and ALFRED C. REX, of the city of Philadelphia, county of Philadelphia, and State of Pennsylvania, have invented an Improvement in Toy Money-Boxes, of which the following is a specification.

Our invention has reference to toy money-boxes; and it consists in the figure of a lion or other animal at the base of a tree, or its equivalent, and provided with a movable jaw, combined with the figures of monkeys on the top of said tree, and so arranged that money handed to the monkey shall be deposited into the jaws of the lion, and in details of construction, all of which are fully set forth in the following specification, and shown in the accompanying drawings, which form part thereof.

The object of our invention is the production of a novel, cheap, and useful toy.

Figure 1:
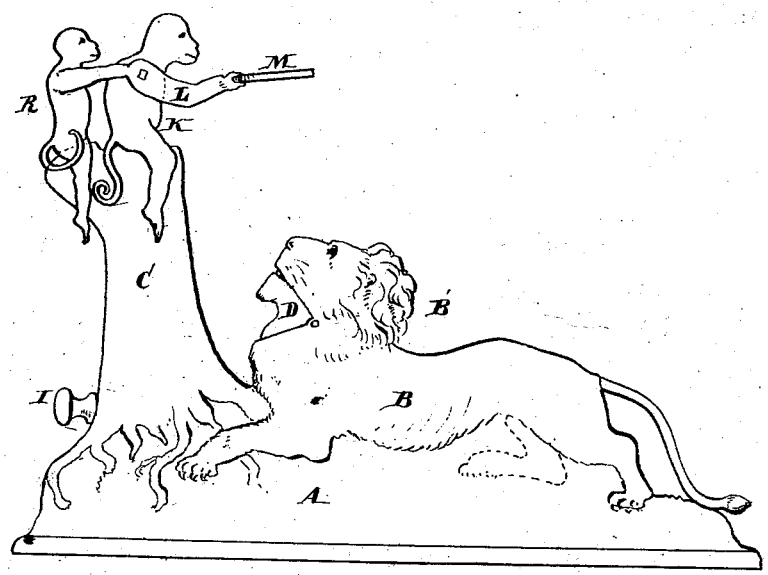
Figure 2:
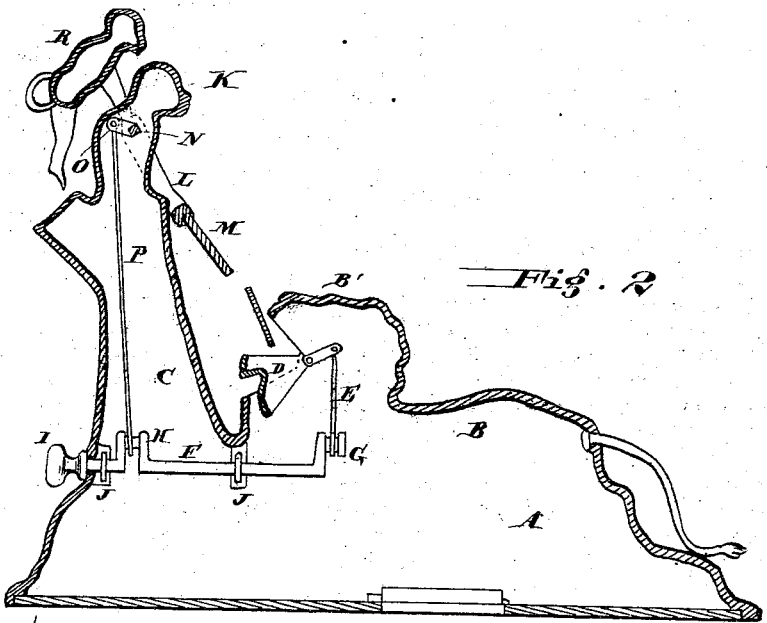

In the drawings, Figure 1 is a side elevation of our improved toy money-box, and Fig. 2 is a sectional elevation of same.

A is the base of the money-box.

B is the figure of a lion or other animal, and may be cast hollow with the base A, as shown. The head B' is directed upward, and is provided with a movable jaw, D, which is worked by a rod, E, and crank G on shaft F, which is carried by bearings J J, and is adapted to be rotated by knob I.

Extending up from the base A, and in front of the lion, is a hollow pedestal, C, to the top of which is secured the figure of a monkey, K, having movable arms L, holding a receptacle for the money. These arms L are secured to a rock-shaft, N, having a crank, O, which is connected with crank H on shaft F. Secured to the arms L, and to the rear of the figure K, is a figure of a small monkey, R. From this it is seen that when the arms L are depressed the figure R ascends above the head of the figure K, as if mounting upon its shoulders. While the figures of a lion and monkeys have been shown, it is evident that any other figures might be used.

The operation is as follows: The money having been placed upon the plate or receptacle M, the knob I is rotated. This simultaneously opens the lion's mouth, lowers the arms L, raises the figure R, and causes the money to fall into the open mouth of the lion, which immediately closes, and all the parts return to their original positions.

Having now described our invention, what we claim as new, and desire to secure by Letters Patent, is—

1. A toy money-box, which consists of the figure of an animal having a movable jaw, a pedestal, and a figure of an animal supported upon said pedestal, and provided with movable arms adapted to receive the money, in combination with means to simultaneously rock said arms to discharge the money and open the jaw of the animal at the foot of the pedestal, substantially as and for the purpose specified.

2. A toy money-box, which consists of the figure of an animal having a movable jaw, a pedestal, a figure of an animal supported upon said pedestal, and provided with movable arms adapted to receive the money, and a figure of an animal supported and carried by said arms, in combination with means to simultaneously rock said arms to discharge the money, raise the figure carried by said arms, and open the jaw of the animal at the foot of the pedestal, substantially as and for the purpose specified.

3. The combination of base A, lion B, having movable jaw D, pedestal C, monkey K, having movable arms L, shaft F, having cranks G H, rods E and P, crank-arm O, and shaft N, substantially as and for the purpose specified.

4. The combination of base A, lion B, having movable jaw D, pedestal C, monkey K, having movable arms L, monkey R, carried by said arms L, shaft F, having cranks G H, rods E and P, crank-arm O, and shaft N, substantially as and for the purpose specified.

In testimony of which invention we hereunto set our hands.

LOUIS KYSER.
ALFRED C. REX.

Witnesses:
R. M. HUNTER,
WILLIAM McWADE.